US012658605B2

(12) United States Patent
Xiao et al.

(10) Patent No.: US 12,658,605 B2

(45) Date of Patent: Jun. 16, 2026

(54) ANTENNA SYSTEM AND BASE STATION ANTENNA FEEDER SYSTEM

(71) Applicant: HUAWEI TECHNOLOGIES CO., LTD., Shenzhen (CN)

(72) Inventors: Weihong Xiao, Dongguan (CN); Zhiqiang Liao, Shenzhen (CN); Lei Chen, Dongguan (CN); He Cui, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 18/671,924

(22) Filed: May 22, 2024

(65) Prior Publication Data

US 2024/0313430 A1 Sep. 19, 2024

Related U.S. Application Data

(63) Continuation of application No. PCT/CN2022/138897, filed on Dec. 14, 2022.

(30) Foreign Application Priority Data

Dec. 14, 2021 (CN) ......................... 202111530469.2
Sep. 21, 2022 (CN) ......................... 202211152347.9

(51) Int. Cl.
*H01Q 3/26* (2006.01)
*H01Q 1/24* (2006.01)
(Continued)

(52) U.S. Cl.
CPC ............. *H01Q 23/00* (2013.01); *H01Q 1/246* (2013.01); *H01Q 3/30* (2013.01); *H01Q 15/0013* (2013.01); *H01Q 15/14* (2013.01)

(58) Field of Classification Search
CPC .......... H01Q 1/24; H01Q 1/246; H01Q 15/00; H01Q 15/0013; H01Q 15/14; H01Q 19/10;
(Continued)

(56) References Cited

U.S. PATENT DOCUMENTS 4,680,591 A * 7/1987 Axford ................ H01Q 21/061 343/895
6,292,133 B1 * 9/2001 Lynch .................. H01Q 21/065 342/368
(Continued)

FOREIGN PATENT DOCUMENTS

CN 102396111 B 10/2016
CN 111066200 B 11/2021
(Continued)

*Primary Examiner* — Tho G Phan

(57) ABSTRACT

This application provides an antenna system and a base station antenna feeder system. The antenna system includes a first antenna and a second antenna. The first antenna includes a first radiating element array and a first phase shifter, and the first phase shifter is electrically connected to the first radiating element array. The second antenna includes a second radiating element array and a second phase shifter, and the second phase shifter is electrically connected to the second radiating element array. The first phase shifter is disposed at an edge of the first antenna, and the first phase shifter is configured to be detachably connected to the second antenna. In the antenna system in this solution, the first antenna and the second antenna can be detachably connected, so that an antenna configuration can be upgraded without replacing an original antenna and with low costs and a convenient operation.

18 Claims, 9 Drawing Sheets

(51) Int. Cl.

| | |
|---|---|
| ***H01Q 3/30*** | (2006.01) |
| ***H01Q 15/00*** | (2006.01) |
| ***H01Q 15/14*** | (2006.01) |
| ***H01Q 21/00*** | (2006.01) |
| ***H01Q 23/00*** | (2006.01) |

(58) Field of Classification Search

CPC .. H01Q 19/108; H01Q 21/00; H01Q 21/0025; H01Q 21/06; H01Q 21/26; H01Q 23/00; H01Q 3/26; H01Q 3/28; H01Q 3/30

See application file for complete search history.

(56) References Cited

U.S. PATENT DOCUMENTS

| | | | | |
|---|---|---|---|---|
| 9,627,774 | B2 * | 4/2017 | Pu | H01Q 5/50 |
| 10,236,580 | B2 * | 3/2019 | Wang | H01Q 21/0025 |
| 11,316,257 | B2 * | 4/2022 | Lv | H01Q 21/0025 |
| 11,539,120 | B2 * | 12/2022 | Pelletti | G05D 1/028 |
| 12,444,837 | B2 * | 10/2025 | Di | H01Q 1/246 |
| 2021/0305683 | A1 | 9/2021 | Hou et al. | |
| 2021/0305718 | A1 | 9/2021 | Li et al. | |

FOREIGN PATENT DOCUMENTS

| | | | |
|---|---|---|---|
| EP | 3751665 | A1 | 12/2020 |
| WO | 2021103032 | A1 | 6/2021 |

* cited by examiner

ANTENNA SYSTEM AND BASE STATION ANTENNA FEEDER SYSTEM

CROSS-REFERENCE TO RELATED APPLICATIONS

This application is a continuation of Application No. PCT/CN2022/138897, filed on Dec. 14, 2022, which claims priority to Chinese Patent Application No. 202111530469.2, filed on Dec. 14, 2021 and Chinese Patent Application No. 202211152347.9, filed on Sep. 21, 2022. All of the aforementioned patent applications are hereby incorporated by reference in their entireties.

TECHNICAL FIELD

This application relates to the field of communication technologies, and specifically, to an antenna system and a base station antenna feeder system.

BACKGROUND

With development of wireless communication technologies, a base station can support increasingly more communication frequency bands. Therefore, a structure of a base station antenna is increasingly complex, and an antenna integration level of a single antenna installation platform is increasingly high. With development of technologies, an antenna system needs to be upgraded in directions such as an operating frequency band or a quantity of interfaces. In the conventional technology, an existing antenna system usually needs to be detached to safely replace a new antenna system. This solution has a complex operation and high costs.

SUMMARY

This application provides an antenna system and a base station antenna feeder system, so that the antenna system is extended as required with low extension costs and a convenient operation.

According to a first aspect, this application provides an antenna system. The antenna system includes a first antenna and a second antenna. The first antenna includes a first radiating element array and a first phase shifter, and the first phase shifter is electrically connected to the first radiating element array to feed the first radiating element array. The second antenna includes a second radiating element array and a second phase shifter, and the second phase shifter is electrically connected to the second radiating element array to feed the second radiating element array. The first antenna and the second antenna are detachably connected, so that an antenna configuration can be upgraded without replacing an original antenna and with low costs and a convenient operation. In addition, the second antenna in this solution may be modularized to simplify antenna assembly.

In a specific technical solution, the first phase shifter of the first antenna is disposed at an edge of the first antenna, and the first phase shifter is configured to be detachably connected to the second antenna, thereby helping simplify a structure of the first antenna. In this solution, the second antenna may be connected via the first phase shifter. The first phase shifter has high structural strength, which helps improve connection reliability between the second antenna and the first antenna.

In an optional technical solution, the second phase shifter may be detachably connected to the first phase shifter. That is, the second phase shifter may be further used as a connector of the second antenna. In this solution, the first phase shifter and the second phase shifter are detachably connected, so that the first antenna and the second antenna can be detachably connected, thereby simplifying a structure of the second antenna.

When the first phase shifter and the second phase shifter are disposed, the first phase shifter and the second phase shifter may be disposed in parallel. This solution facilitates implementation of connection between the first phase shifter and the second phase shifter, and helps reduce a space occupied by the antenna system.

In another specific technical solution, the first phase shifter and the second phase shifter may be of an integrated structure. This solution enables the first phase shifter and the second phase shifter to be connected with strong strength.

The first radiating element array may include a first radiating element and a first balun, and the first radiating element is electrically connected to the first phase shifter via the first balun. Similarly, the second radiating element array may include a second radiating element and a second balun, and the second radiating element is electrically connected to the second phase shifter via the second balun. The first balun tilts toward a direction in which the first phase shifter faces away from the second phase shifter, and the second balun tilts toward a direction in which the second phase shifter faces away from the first phase shifter. In this solution, the first radiating element array and the second radiating element array tilt toward opposite directions. In this way, it is not easy to have structural interference.

When the second radiating element array includes the second radiating element and the second balun, the second radiating element is electrically connected to the second phase shifter via the second balun. Alternatively, the second balun may be perpendicular to a surface of the second radiating element. In this solution, the second balun is vertically disposed, and does not need to tilt. Therefore, the second radiating element array does not need to be eccentrically disposed, and installation strength of the second radiating element array is high.

The edge of the first antenna includes an area of one-tenth of a width that is of the first antenna and that is in a first direction. The first direction is perpendicular to an extension direction of the first phase shifter. That is, the edge of the first antenna is not an absolute side edge, but an area close to a side edge.

The first antenna includes a first reflection plate, and a specific type of the first reflection plate is not limited. The first reflection plate may be a full-frequency reflection plate, may be a frequency selective surface, or may be a 3D reflection plate formed by a plurality of frequency selective surfaces. A proper surface may be selected based on an actual requirement.

The second antenna includes a second reflection plate, and a cross section of the second phase shifter is rectangular. When the second phase shifter and the second reflection plate are disposed, a length that is of the cross section of the second phase shifter and that is in a direction perpendicular to the second reflection plate may be greater than a length that is of the cross section of the second phase shifter and that is in a direction parallel to the second reflection plate. In this solution, an area of the second antenna on a plane in which the second reflection plate is located may be small, thereby helping reduce an antenna installation platform space occupied by the antenna system and helping reduce a wind load of the antenna system.

In a specific technical solution, the second antenna includes a second reflection plate, and the second reflection plate may have a hollow-out structure. The hollow-out structure can reduce a wind load of the second reflection plate, and help reduce the wind load of the antenna system.

A radiating surface of the first radiating element array and a radiating surface of the second radiating element array may be disposed in parallel, so that beam directions of the first antenna and the second antenna are the same, and the first antenna and the second antenna operate together, thereby implementing extension of the antenna system.

The first antenna may further include a first mainboard and a first driver interface, and the first driver interface is connected to the first mainboard. Similarly, the second antenna includes a second mainboard and a second driver interface, and the second driver interface is connected to the second mainboard. In this solution, each antenna has a mainboard and a driver interface, so that the first antenna and the second antenna can be independently driven as required, or the first driver interface may be connected to the second driver interface, so that the second antenna is driven by the first antenna, thereby implementing a flexible application of the antenna system.

The antenna system may further include a correction circuit board. The correction circuit board is electrically connected to the first radiating element array and the second radiating element array to correct phases of the first radiating element array and the second radiating element array, so that phase information of the interfaces of the antenna system is normalized. In a specific technical solution, the correction circuit board may be disposed on the first antenna, or may be disposed on the second antenna. Specifically, an installation position of the correction circuit board is designed based on an actual requirement.

An operating frequency band of the first antenna and an operating frequency band of the second antenna may be the same or different, and may be designed as required. For example, when it is only necessary to increase a quantity of interfaces of the antenna system, the operating frequency band of the first antenna may be the same as the operating frequency band of the second antenna. When an operating frequency band of the antenna system needs to be increased, the operating frequency band of the first antenna may be different from the operating frequency band of the second antenna.

According to a second aspect, this application further provides a base station antenna feeder system. The base station antenna feeder system includes the antenna system in the first aspect. The base station antenna feeder system in this solution may extend the antenna system based on an actual application requirement, to increase a quantity of interfaces of the antenna system or extend an operating frequency band of the antenna system.

To install the antenna system, the base station antenna feeder system may further include an installation bracket, the antenna system includes an installation structure, and the antenna system is installed on the installation bracket via the installation structure. Specifically, the installation structure may be located on only the first antenna, or may be connected to only the first antenna, the second antenna does not have an installation structure, and the second antenna is connected to the first antenna. Therefore, in this solution, a space required by the antenna system for the installation bracket is reduced, thereby helping improve utilization of the installation bracket.

In a technical solution, the first antenna includes a first mainboard and a first driver interface, and the first driver interface is connected to the first mainboard to transmit a drive signal to the first antenna. The second antenna includes a second mainboard and a second driver interface, and the second driver interface is connected to the second mainboard to transmit a drive signal to the second antenna. The base station antenna feeder system further includes remote radio units. The remote radio units include a first remote radio unit and a second remote radio unit, the first remote radio unit includes a third driver interface, and the second remote radio unit includes a fourth driver interface. In actual operation, the third driver interface is connected to the first driver interface to input the drive signal to the first antenna, to drive, via the first remote radio unit, the first antenna to operate. The fourth driver interface is connected to the second driver interface to input the drive signal to the second antenna, to drive, via the second remote radio unit, the second antenna to operate. In this solution, the first antenna and the second antenna may be separately and independently driven.

In still another technical solution, the first antenna includes a first mainboard and a first driver interface, and the first driver interface is connected to the first mainboard to transmit a drive signal to the first antenna. The second antenna includes a second mainboard and a second driver interface, and the second driver interface is connected to the second mainboard to transmit a drive signal to the second antenna. The base station antenna feeder system further includes a remote radio unit, and the remote radio unit includes a fifth driver interface. The fifth driver interface is connected to the first driver interface to input the drive signal to the first antenna. The first driver interface is connected to the second driver interface, so that the drive signal can be transmitted to the second antenna via the first antenna. In this solution, the first antenna can be used to drive the second antenna to operate.

REFERENCE NUMERALS

1—antenna system; 11—radome;
12—radiating element array; 13—reflection plate;
14—feeding network; 141—transmission component;
142—calibration network; 143—phase shifter;
144—combiner; 145—filter;
15—first antenna; 151—first radiating element array;
1511—first radiating element; 1512—first balun;
152—first phase shifter; 153—first reflection plate;
154—first radome; 156—first motor;
157—first mainboard; 158—first driver interface;
159—first radio frequency interface; 1510—correction circuit board;
16—second antenna; 161—second radiating element array;
1611—second radiating element; 1612—second balun;
162—second phase shifter; 163—second reflection plate;
164—second radome; 166—second motor;
167—second mainboard; 168—second driver interface;
169—second radio frequency interface; 2—installation bracket;
3—antenna adjustment support; 4—remote radio unit;
41—first remote radio unit; 411—third driver interface;
42—second remote radio unit; 421—fourth driver interface;
43—fifth driver interface; 44—third radio frequency interface;
5—baseband processing unit; and 6—cable.

DESCRIPTION OF EMBODIMENTS

Figure 1:
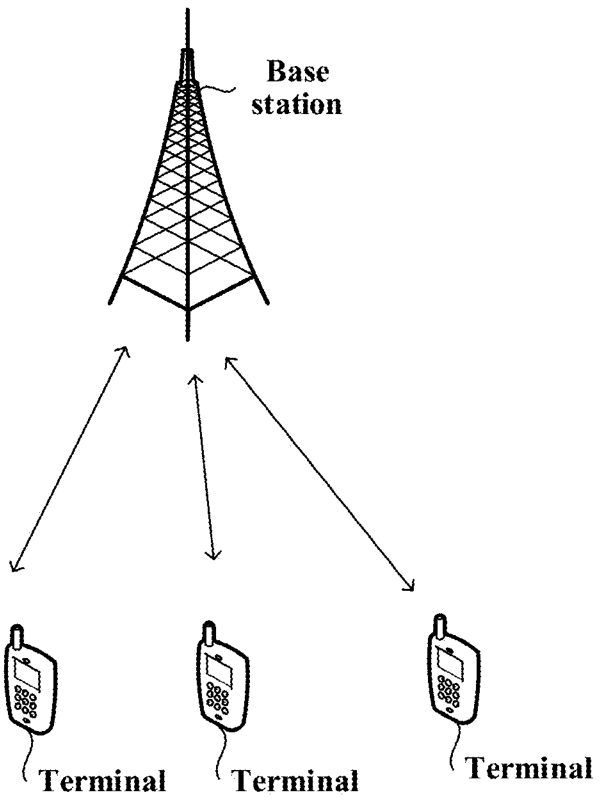
FIG. 1 is a diagram of a system architecture to which an embodiment of this application is applicable.

To facilitate understanding of the antenna and the base station antenna feeder system provided in embodiments of this application, the following describes an application scenario of the antenna and the base station antenna feeder system. FIG. 1 is a diagram of an example of a system architecture to which an embodiment of this application is applicable. As shown in FIG. 1, an application scenario may include a base station and a terminal. Wireless communication may be implemented between the base station and the terminal. The base station may be located in a base station subsystem (BBS), a UMTS terrestrial radio access network (UTRAN), or an evolved universal terrestrial radio access network (E-UTRAN), and is configured to perform radio signal cell coverage to implement communication between a terminal device and a wireless network. Specifically, the base station may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB, or eNodeB) in a long term evolution (LTE) system, or may be a radio controller in a cloud radio access network (CRAN) scenario. Alternatively, the base station may be a relay station, an access point, a vehicle-mounted device, a wearable device, a g node (gNodeB or gNB) in a new radio (NR) system, a base station in a future evolved network, or the like. This is not limited in embodiments of this application.

Figure 2:
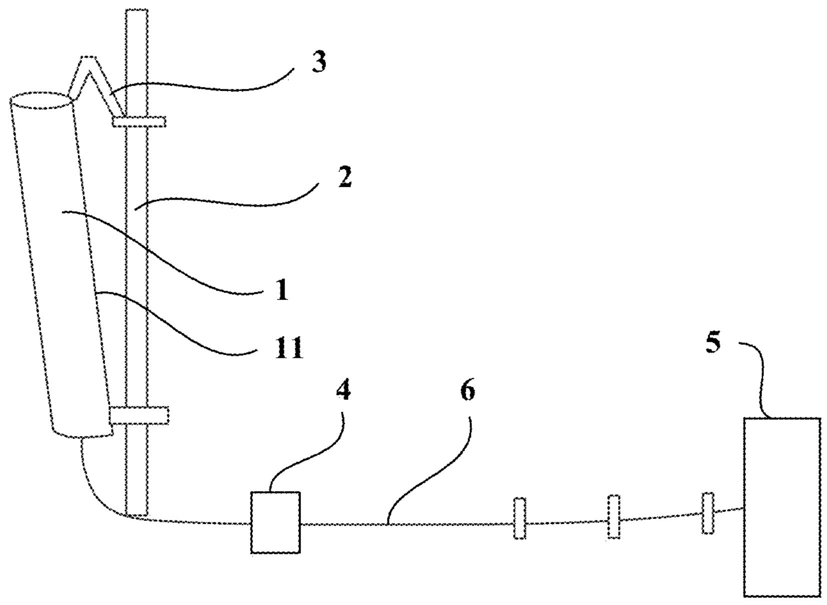
FIG. 2 is a diagram of a structure of a base station antenna feeder system according to a possible embodiment of this application.

FIG. 2 is a diagram of a possible structure of a base station antenna feeder system. Usually, the base station antenna feeder system may include structures such as an antenna system 1, an installation bracket 2, and an antenna adjustment support 3. The antenna system 1 may be installed on the installation bracket 2 via the antenna adjustment support 3, to facilitate receiving or transmitting of a signal of the antenna system 1. Specifically, the installation bracket 2 may be a pole, an iron tower, or the like. Certainly, in another embodiment, the antenna system 1 may alternatively be directly installed on the installation bracket 2.

In a specific technical solution, the antenna system 1 includes a radome 11. The radome 11 has a good electromagnetic wave penetration characteristic in terms of electrical performance, and can withstand an impact of an external harsh environment in terms of mechanical performance, thereby protecting the antenna system 1 from being affected by an external environment.

In addition, a base station may further include a remote radio unit 4 and a baseband processing unit 5. For example, the remote radio unit 4 may be configured to perform frequency selection, amplification, and down-conversion processing on a signal received by the antenna system 1, convert the signal into an intermediate frequency signal or a baseband signal, and send the intermediate frequency signal or the baseband signal to the baseband processing unit 5; or the remote radio unit 4 is configured to perform up-conversion and amplification processing on a signal of the baseband processing unit 5 or an intermediate frequency signal, convert the signal of the baseband processing unit 5 or the intermediate frequency signal into an electromagnetic wave, and send the electromagnetic wave outwards via the antenna system 1. The baseband processing unit 5 may be connected to a feeding network of the antenna system 1 via the remote radio unit 4. In some implementations, the remote radio unit 4 may also be referred to as a remote radio unit (RRU), and the baseband processing unit 5 may also be referred to as a baseband unit (BBU).

In a possible embodiment, the remote radio unit 4 and the baseband processing unit 5 may be simultaneously located at a remote end of the antenna system 1. The remote radio unit 4 and the baseband processing unit 5 may be connected via a cable 6.

Figure 3:
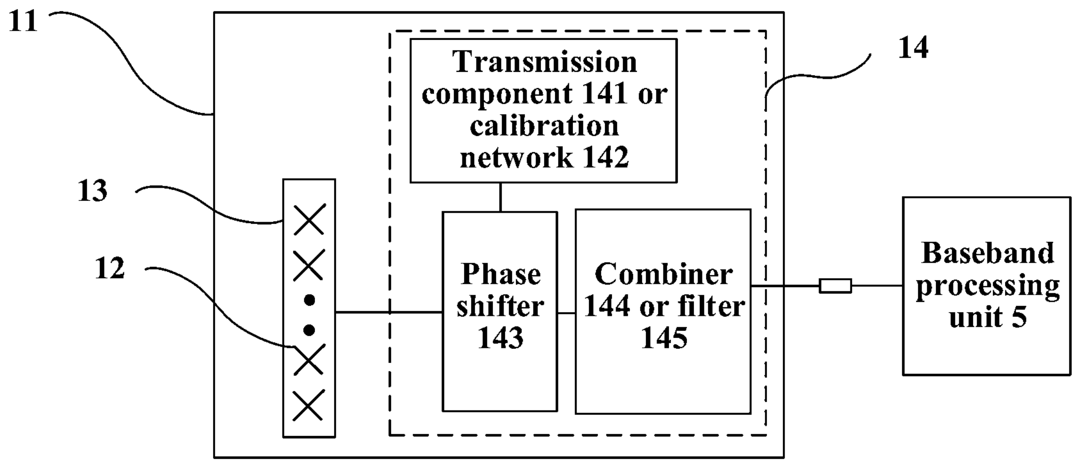
FIG. 3 is a diagram of composition of an antenna according to a possible embodiment of this application.

More specifically, refer to FIG. 2 and FIG. 3 together. FIG. 3 is a diagram of composition of an antenna according to a possible embodiment of this application. As shown in FIG. 3, the antenna system 1 of the base station may include a radiating element array 12 and a reflection plate 13. The radiating element array 12 may also be referred to as an antenna element, an element, or the like, and can effectively send or receive an antenna signal. In the antenna system 1, frequencies of different radiating element arrays 12 may be the same or different. The reflection plate 13 may also be referred to as a bottom panel, an antenna panel, a reflection surface, or the like, and may be made of a metal material. When the antenna system 1 receives a signal, the reflection plate 13 may reflect and aggregate the antenna signal to a receiving point. When the antenna system 1 transmits a signal, the signal emitted to the reflection plate 13 is reflected and transmitted outwards. The radiating element array 12 is usually placed on a surface on a side of the reflection plate 13. This can greatly enhance a signal receiving or transmitting capability of the antenna system 1, and can block and shield interference of another electric wave from a back surface of the reflection plate 13 (in this application, the back surface of the reflection plate 13 refers to a side facing away from the side that is of the reflection plate 13 and that is configured to dispose the radiating element array 12) to antenna signal receiving.

In the antenna system 1 of the base station, the radiating element array 12 is connected to the feeding network 14. The feeding network 14 is usually formed by a controlled impedance transmission line. The feeding network 14 may feed a signal to the radiating element array 12 based on a specific amplitude and a specific phase, or send a received signal to the baseband processing unit 5 of the base station based on a specific amplitude and a specific phase. Specifically, in some implementations, the feeding network 14 may implement different radiation beam directions via a transmission component 141, or may be connected to a calibration network 142 to obtain a calibration signal required by the system. The feeding network 14 may include a phase shifter 143, configured to change a maximum direction of antenna signal radiation. Some modules used for performance extension may be further disposed in the feeding network 14. For example, a combiner 144 may be disposed, to combine signals of different frequencies into one signal and transmit the signal via the antenna system 1; or when the combiner 144 is used reversely, the combiner 144 may be configured to divide, based on different frequencies, a signal received by the antenna system 1 into a plurality of signals and transmit the signals to the baseband processing unit 5 for processing. For another example, a filter 145 may be disposed to filter out an interference signal.

Figure 4:
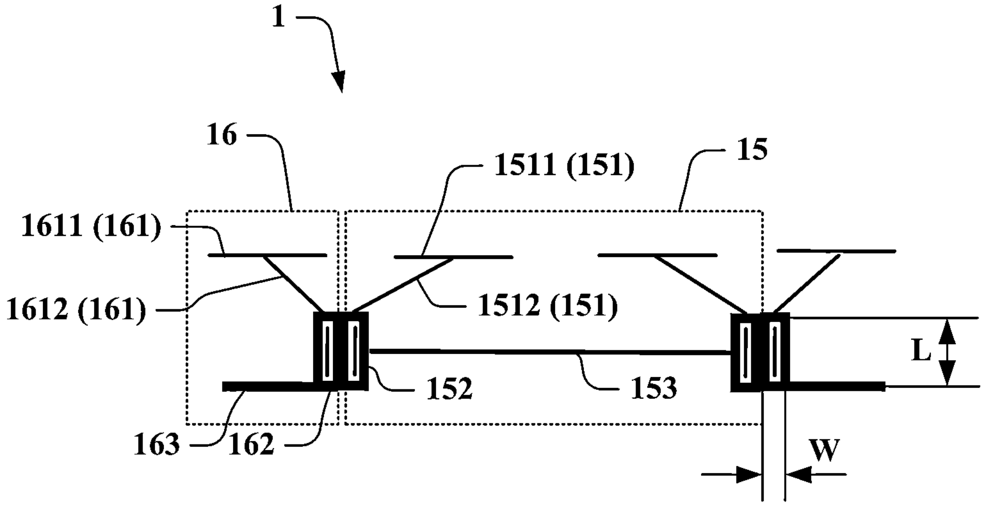
FIG. 4 is a diagram of a structure of an antenna system according to an embodiment of this application.
Figure 5:
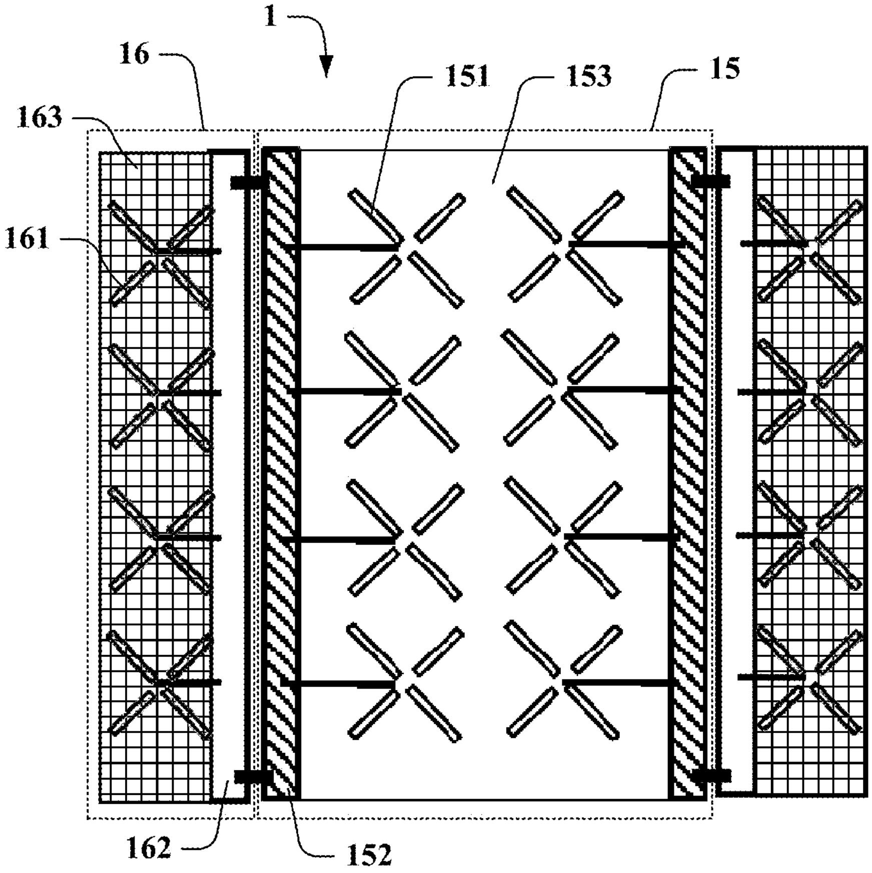
FIG. 5 is a top view of a structure of an antenna system according to an embodiment of this application.

FIG. 4 is a diagram of a structure of an antenna system according to an embodiment of this application, and FIG. 5 is a top view of a structure of an antenna system according to an embodiment of this application. As shown in FIG. 4 and FIG. 5, the antenna system 1 in this embodiment of this application includes a first antenna 15 and a second antenna 16. The first antenna 15 includes a first radiating element array 151 and a first phase shifter 152. The first radiating element array 151 is electrically connected to the first phase shifter 152 to feed the first radiating element array 151. The second antenna 16 includes a second radiating element array 161 and a second phase shifter 162. The second radiating element array 161 is electrically connected to the second phase shifter 162 to feed the second radiating element array 161. In this solution, the first antenna 15 and the second antenna 16 are detachably connected, so that an antenna configuration is upgraded without replacing an original antenna. This solution facilitates extension of the antenna system 1 as required with low costs and a convenient operation. For example, an operating frequency band of the antenna system 1 may be upgraded, or a quantity of interfaces of the antenna system 1 may be increased, to improve a beam capability of the antenna system 1. In addition, in this embodiment of this application, the second antenna 16 may be modularized to simplify antenna assembly.

The first phase shifter 152 of the first antenna 15 is disposed at an edge of the first antenna 15, and the first phase shifter 152 may be configured to be detachably connected to the second antenna 16. In this solution, the first phase shifter 152 of the first antenna 15 is disposed at the edge of the first antenna 15, so that the second antenna 16 is connected via the first phase shifter 152. This helps simplify a structure of the first antenna 15. In addition, the first phase shifter has high structural strength, which helps improve connection reliability between the second antenna and the first antenna.

It should be noted that FIG. 4 may be understood as a diagram of a cross section of an antenna in a direction perpendicular to the first radiating element array. Therefore, only one radiating element in the first radiating element array 151 is shown in the figure, and other radiating elements are shielded by the displayed radiating element. Similarly, only one radiating element in the second radiating element array 161 is shown in the figure, and other radiating elements are shielded by the displayed radiating element. The edge of the first antenna 15 is an entire edge of the first antenna 15, that is, a position that can be directly contacted from the outside of the first antenna 15, or a position in which direct connection to the first antenna 15 can be implemented via a connector. For example, in a specific embodiment, when the first antenna 15 includes a first reflection plate 153, the first phase shifter 152 is disposed at an edge of the first reflection plate 153; and when the first antenna 15 includes a first radome 154, the first phase shifter 152 is in contact with the first radome 154, and the second antenna 16 may be directly connected to the first phase shifter 152 outside the first radome 154.

Figure 6:
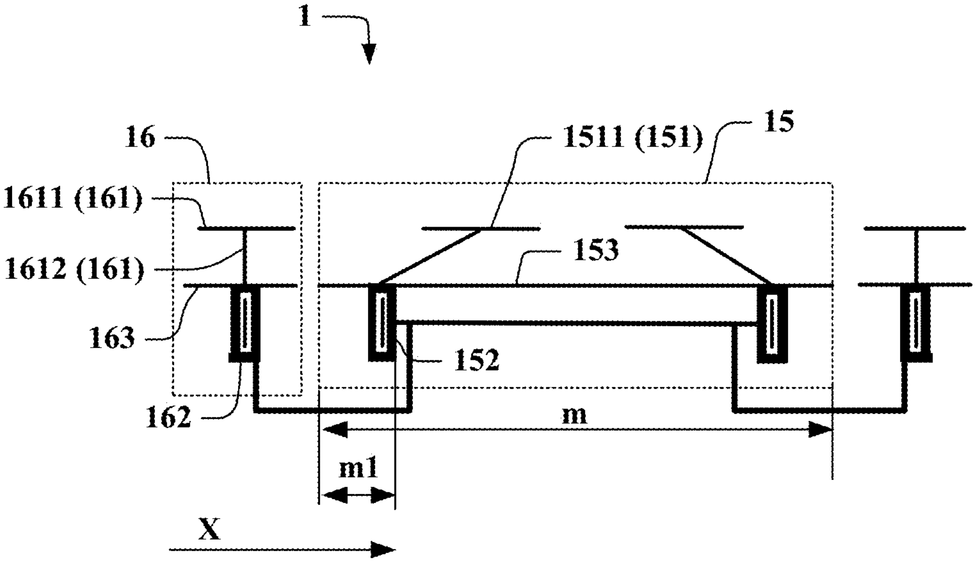
FIG. 6 is a diagram of a structure of an antenna system according to an embodiment of this application.
Figure 7:
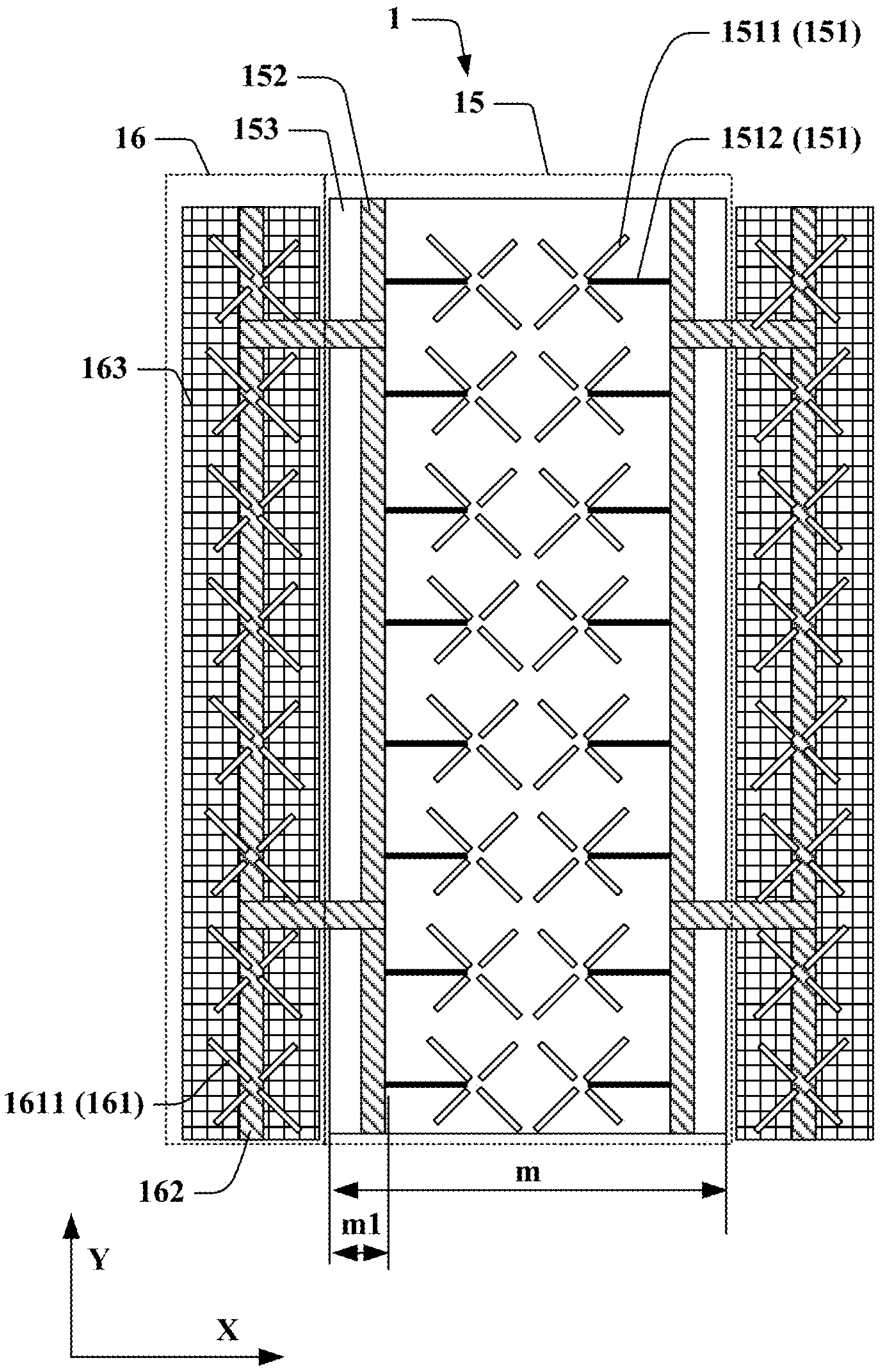
FIG. 7 is a top view of a structure of an antenna system according to an embodiment of this application.

In addition, in terms of a size, the edge of the first antenna 15 is not an absolute edge of the first antenna 15, but an edge area of the first antenna 15. FIG. 6 is a diagram of another structure of an antenna system according to an embodiment of this application, and FIG. 7 is a top view of another structure of an antenna system according to an embodiment of this application. As shown in FIG. 6 and FIG. 7, in another embodiment, the edge of the first antenna 15 includes an area of one-tenth of a width that is of the first antenna 15 and that is in a first direction X. The first direction X is perpendicular to an extension direction Y of the first phase shifter 152. The first phase shifter 152 has sizes in three directions, and a direction in which a size is the largest is the extension direction Y, as shown in FIG. 7. As shown in FIG. 6 and FIG. 7, the width of the first antenna 15 in the first direction X is m, and a width of the edge area is m1. In this case, m and m1 meet $m1 \leq m$. The first phase shifter 152 is disposed in a range of the width m1 of the edge area. That is, the edge of the first antenna 15 is not an absolute side edge, but an area close to a side edge. Specifically, the edge area may be an area other than a center of the first radiating element 1511. For example, when the first antenna 15 includes a first reflection plate 153, the first phase shifter 152 is disposed in an edge area of the first reflection plate 153, that is, in an area of one-tenth of a width that is of the first reflection plate 153 and that is in a direction starting from a side edge to a central area, that is, $m1 = m/10$. In this case, a size of the connector that connects the first phase shifter 152 to the second phase shifter 162 is large, provided that the first phase shifter 152 and the second phase shifter 162 can be detachably connected.

In a specific technical solution, when the second antenna 16 is detachably connected to the first phase shifter 152, the second phase shifter 162 of the second antenna 16 may be detachably connected to the first phase shifter 152. Because the first phase shifter 152 usually includes a cavity made of a metal material, and a wall surface of the cavity is thick, the first phase shifter 152 has strong strength and may be used as a connector to connect the first phase shifter 152 to the second antenna 16. In this solution, no additional structure needs to be disposed to connect the first antenna 15 to the second antenna 16, thereby helping simplify a structure of the antenna system 1. In addition, costs of the antenna system 1 can be further reduced.

When the antenna system 1 in the technical solution of this application operates, the first antenna 15 may be first installed on the installation bracket 2. When the antenna system 1 needs to be extended, the second antenna 16 may be installed on the first antenna 15 to extend the antenna system 1.

Specifically, the second antenna 16 may be directly connected to the first antenna 15. In this case, the first antenna 15 is used to implement fixed installation, and the first antenna 15 does not need to be installed on the installation bracket 2. For example, the antenna system 1 includes an installation structure, and the antenna system 1 is installed on the installation bracket 2 via the installation structure. The installation structure is located on only the first antenna 15, and is not located on the second antenna 16. The second antenna 16 is connected to the first antenna 15. Therefore, in this solution, a space required by the antenna system for the installation bracket is reduced, thereby helping improve utilization of the installation bracket. Certainly, in another embodiment, the second antenna 16 may alternatively be installed on the installation bracket 2.

In a specific embodiment, an operating frequency band of the first antenna 15 may be the same as or different from an operating frequency band of the second antenna 16. When the operating frequency band of the first antenna 15 is the same as the operating frequency band of the second antenna 16, the quantity of interfaces of the antenna system 1 may be increased. Alternatively, when the operating frequency band of the first antenna 15 is different from the operating frequency band of the second antenna 16, the operating frequency band of the antenna system 1 may be extended.

It should be noted that, in FIG. 4 and FIG. 5 in this embodiment of this application, the antenna system 1 includes one first antenna 15 and two second antennas 16, and the two second antennas 16 are disposed on two sides of the first antenna 15. The first antenna 15 includes two first radiating element arrays 151, each second antenna 16 includes one first radiating element array 151, and the antenna system 1 may include four radiating element arrays. For example, all radiating elements in this embodiment of this application are dual-polarized radiating elements, and may be connected to two radio frequency interfaces to transmit a radio frequency signal. Therefore, each first radiating element array 151 is connected to two radio frequency interfaces, and each second radiating element array 161 is connected to two radio frequency interfaces. In this case, the two first radiating element arrays 151 of the first antenna 15 may be connected to four radio frequency interfaces. Similarly, the second radiating element array 161 of each second antenna 16 may be connected to two radio frequency interfaces. Therefore, when the antenna system 1 is applied, the first antenna 15 may be installed first. In this case, the antenna system 1 is an antenna system 1 having four radio frequency interfaces. When a quantity of radio frequency interfaces needs to be increased, two second antennas 16 may be added, so that the antenna system 1 is upgraded to an antenna system 1 with eight radio frequency interfaces.

When the first phase shifter 152 and the second phase shifter 162 are disposed, the first phase shifter 152 and the second phase shifter 162 may be disposed in parallel, to facilitate connection between the first phase shifter 152 and the second phase shifter 162. Certainly, in another embodiment, the first phase shifter 152 and the second phase shifter 162 may be not disposed in parallel. This is not limited in this application, and disposition may be implemented based on an actual application scenario of the antenna system 1.

In addition, the first phase shifter 152 and the second phase shifter 162 may be of metal structures. It is convenient for the first phase shifter 152 and the second phase shifter 162 to be grounded. In addition, it is convenient for the first phase shifter 152 and the second phase shifter 162 to be used as structural members to install another structure.

The first phase shifter 152 and the second phase shifter 162 may alternatively be of an integrated structure. In this solution, connection strength between the first antenna 15 and the second antenna 16 is strong. In this embodiment, a manufacturing process of the first phase shifter 152 and the second phase shifter 162 may be simplified. It should be noted that, when the first phase shifter 152 and the second phase shifter 162 are integrally formed, in a possible embodiment, a structure, for example, a circuit board or a strip, may be directly manufactured in the second phase shifter 162.

The first antenna 15 may further include a first reflection plate 153, and the first reflection plate 153 is configured to reflect a radiation signal of the first radiating element array 151. The first reflection plate 153 may be disposed between two first phase shifters 152. In a specific embodiment, the first reflection plate 153 may be fixedly connected to the first phase shifter 152, and the first phase shifter 152 is connected to the edge of the first reflection plate 153. A specific type of the first reflection plate 153 is not limited. For example, the first reflection plate 153 may be a full-frequency reflection plate. Specifically, the full-frequency reflection plate is a metal panel on a front side, can reflect radiation signals of all frequencies, and has only a reflection function. A structure of the first reflection plate 153 is simple, thereby simplifying the structure of the first antenna 15, and reducing costs of the first antenna 15. In addition, in another embodiment, the first reflection plate 153 may alternatively be a frequency selective surface configured to transmit a radiation signal of a specific frequency and reflect a radiation signal of a specific frequency as required. Alternatively, the first reflection plate 153 may alternatively be a 3D reflection plate formed by a plurality of frequency selective surfaces. In a specific embodiment, a radiating surface of the first radiating element array 151 may be disposed in parallel with the first reflection plate 153.

The second antenna 16 further includes a second reflection plate 163, and the second phase shifter 162 may be fixedly connected to the second reflection plate 163. Specifically, the second phase shifter 162 may be connected to an edge of the second reflection plate 163. The second reflection plate 163 is configured to reflect a radiation signal of the second radiating element array 161. In a specific embodiment, a radiating surface of the second radiating element array 161 may be disposed in parallel with the second reflection plate 163.

A cross section of the second phase shifter 162 may be rectangular, and a length L that is of the cross section of the second phase shifter 162 and that is in a direction perpendicular to the second reflection plate 163 is greater than a length W that is of the cross section of the second phase shifter 162 and that is in a direction parallel to the second reflection plate 163. That is, a sidewall that is of the second phase shifter 162 and that has a smaller area is parallel to the second reflection plate 163, and a sidewall that is of the second phase shifter 162 and that has a larger area is perpendicular to the second reflection plate 163. In this solution, an area of the second antenna 16 on a plane in which the second reflection plate 163 is located may be small, thereby helping reduce an antenna installation platform space occupied by the antenna system 1 and helping reduce a wind load of the antenna system 1.

In a specific technical solution, the second reflection plate 163 has a hollow-out structure. The hollow-out structure may be a plurality of holes, and the plurality of holes may be evenly distributed or may be unevenly distributed on the second reflection plate 163. In addition, a shape of the hole is not limited, may be a square, a circle, a triangle, a hexagon, an irregular shape, or the like, and may be designed as required. The hollow-out structure can reduce a wind load of the second reflection plate 163, and help reduce the wind load of the antenna system 1.

Still refer to FIG. 4 and FIG. 5. In a specific embodiment, the radiating surface of the first radiating element array 151 may be parallel to the radiating surface of the second radiating element array 161. In this solution, radiation directions of the first antenna 15 and the second antenna 16 are the same, so that the first antenna 15 and the second antenna 16 operate together to extend the antenna system 1. Certainly, in another embodiment, the radiating surface of the first radiating element array 151 and the radiating surface of the second radiating element array 161 may be not parallel to each other, and may be disposed based on an actual requirement.

Figure 8:
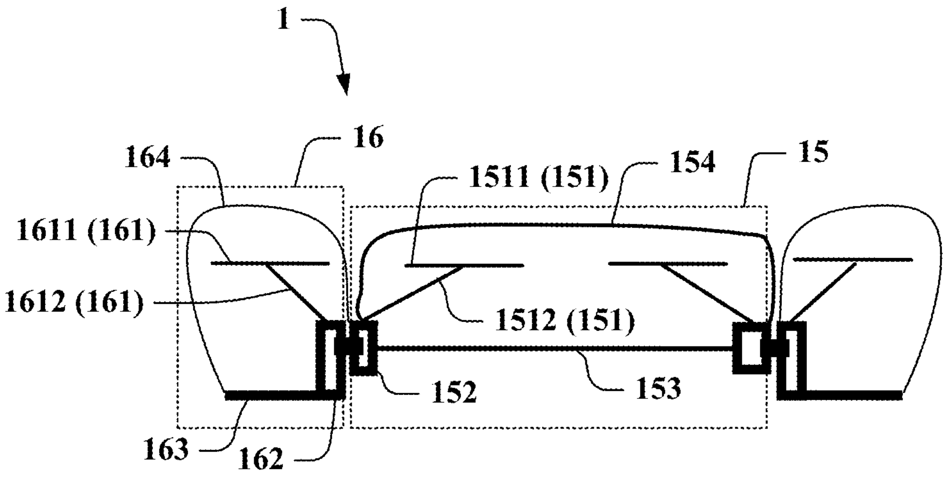
FIG. 8 is a diagram of another structure of an antenna system according to an embodiment of this application.

FIG. 8 is a diagram of another structure of an antenna system according to an embodiment of this application. As shown in FIG. 8, in an optional technical solution, the first antenna 15 has a first radome 154. The first radiating element array 151 and the first phase shifter 152 are disposed in the first radome 154. The first radome 154 can protect the first radiating element array 151 and the first phase shifter 152. The second antenna 16 may also have a second radome 164, and the second radiating element array 161 and the second phase shifter 162 are disposed in the second radome 164. The second radome 164 can protect the second radiating element array 161 and the second phase shifter 162.

Figure 9:
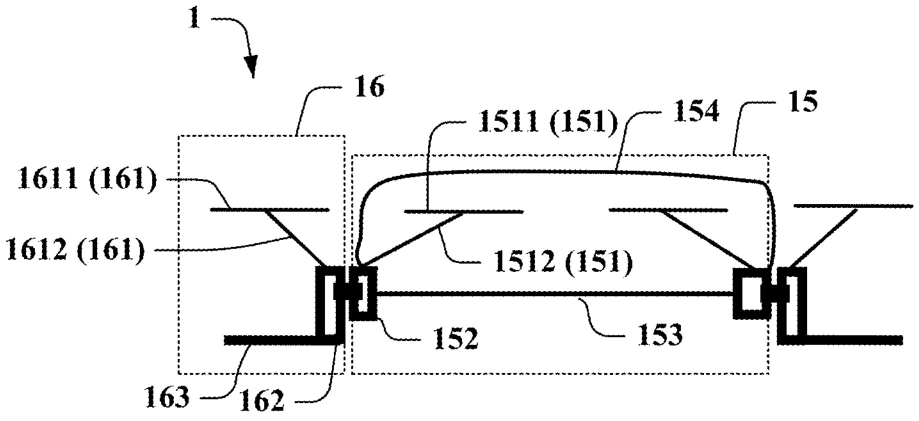
FIG. 9 is a diagram of another structure of an antenna system according to an embodiment of this application.

FIG. 9 is a diagram of another structure of an antenna system according to an embodiment of this application. As shown in FIG. 9, in another optional technical solution, the first antenna 15 may have a first radome 154, and the second antenna 16 may not have a second radome 164. In this solution, the second antenna 16 has a small wind load, which helps reduce the wind load of the entire antenna system 1.

Figure 10:
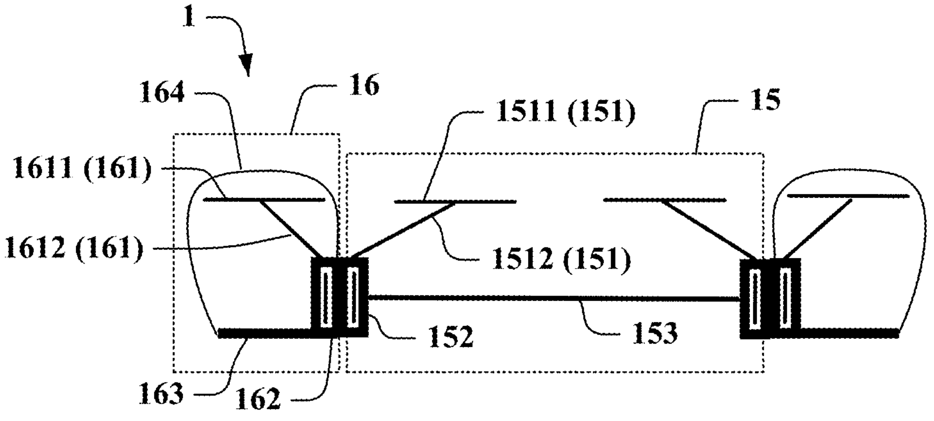
FIG. 10 is a diagram of another structure of an antenna system according to an embodiment of this application.

FIG. 10 is a diagram of another structure of an antenna system according to an embodiment of this application. As shown in FIG. 10, in another optional technical solution, the first antenna 15 may not have a first radome 154, and the second antenna 16 may have a second radome 164. Disposition of the radomes is not specifically limited in this application. Certainly, as shown in FIG. 4, the first antenna 15 may not have the first radome 154, and the second antenna 16 may not have the second radome 164. Disposition of the radomes of the first antenna 15 and the second antenna 16 may be designed based on factors such as an operating environment of the antennas.

Still refer to FIG. 8 to FIG. 10. The first radiating element array 151 includes a first radiating element 1511 and a first balun 1512, and the first radiating element 1511 is electrically connected to the first phase shifter 152 via the first balun 1512. The second radiating element array 161 includes a second radiating element 1611 and a second balun 1612, and the second radiating element 1611 is electrically connected to the second phase shifter 162 via the second balun 1612. The first balun 1512 tilts toward a direction in which the first phase shifter 152 faces away from the second phase shifter 162, and the second balun 1612 tilts toward a direction in which the second phase shifter 162 faces away from the first phase shifter 152. In this solution, the first radiating element array 151 and the second radiating element array 161 may tilt toward opposite directions, so that no structural interference occurs between the first radiating element array 151 and the second radiating element array 161. In a specific embodiment, an orthographic projection of the first radiating element array 151 on the first reflection plate 153 may be completely located on the first reflection plate 153, and an orthographic projection of the second radiating element array 161 on the second reflection plate 163 may be completely located on the second reflection plate 163.

It should be noted that, it may be considered that the first balun 1512 and the first reflection plate 153 are disposed at an acute angle, and the second balun 1612 and the second reflection plate 163 are disposed at an acute angle. Tilting of the first balun 1512 refers to a disposition trend of an overall structure of the first balun 1512. Similarly, tilting of the second balun 1612 refers to a disposition trend of an overall structure of the second balun 1612. For example, the first balun 1512 and the second balun 1612 may be of straight-line structures, or may be of segmented structures. For example, the first balun 1512 includes two parts. One part is perpendicular to the first reflection plate 153, and the other part is disposed at an acute angle with the first reflection plate 153, or the other part tilts toward the direction in which the first phase shifter 152 faces away from the second phase shifter 162. Similarly, the second balun 1612 may also be of a straight-line structure or a segmented structure. When the second balun 1612 is of a segmented structure, the second balun 1612 may also include two parts. One part is perpendicular to the second reflection plate 163, and the other part is disposed at an acute angle with the second reflection plate 163, or the other part tilts toward the direction in which the second phase shifter 162 faces away from the first phase shifter 152. In conclusion, it is only required that the first balun 1512 is generally disposed at the acute angle with the first reflection plate 153 and tilts toward a center of the first reflection plate 153; and similarly, it is only required that the second balun 1612 is generally disposed at the acute angle with the second reflection plate 163 and tilts toward a center of the second reflection plate 163.

Figure 11:
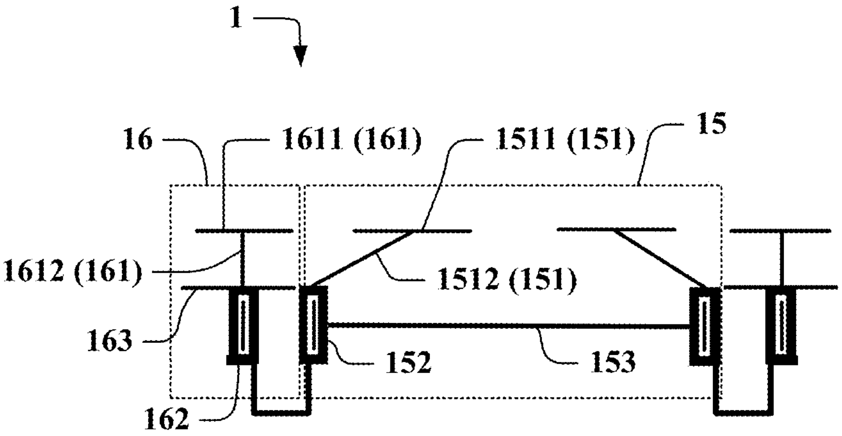
FIG. 11 is a diagram of a structure of an antenna system according to an embodiment of this application.
Figure 12:
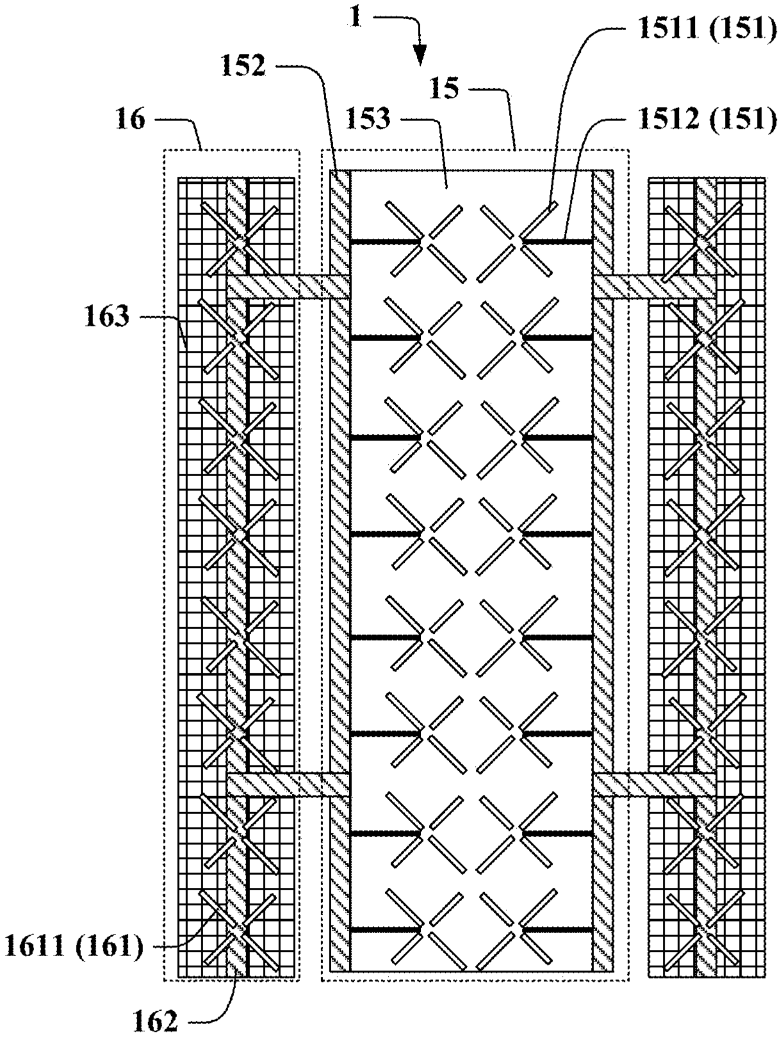
FIG. 12 is a top view of a structure of an antenna system according to an embodiment of this application.

FIG. 11 is a diagram of another structure of an antenna system according to an embodiment of this application, and FIG. 12 is a top view of a structure of an antenna system according to an embodiment of this application. As shown in FIG. 11 and FIG. 12, in another embodiment of this application, the second radiating element array 161 includes a second radiating element 1611 and a second balun 1612, and the second radiating element 1611 is electrically connected to the second phase shifter 162 via the second balun 1612. In this embodiment, the second balun 1612 is perpendicular to a surface of the second radiating element 1611. Specifically, an orthographic projection of a center of the second balun 1612 on the second reflection plate 163 may overlap an orthographic projection of a center of the second radiating element 1611 on the second reflection plate 163, and the center of the second balun 1612 and the center of the second radiating element 1611 are disposed correspondingly. In this solution, the second balun 1612 does not need to tilt, and the second radiating element 1611 does not need to be offset. Therefore, strength of the second radiating element array 161 can be improved, and vibration resistance is strong.

Figure 13:
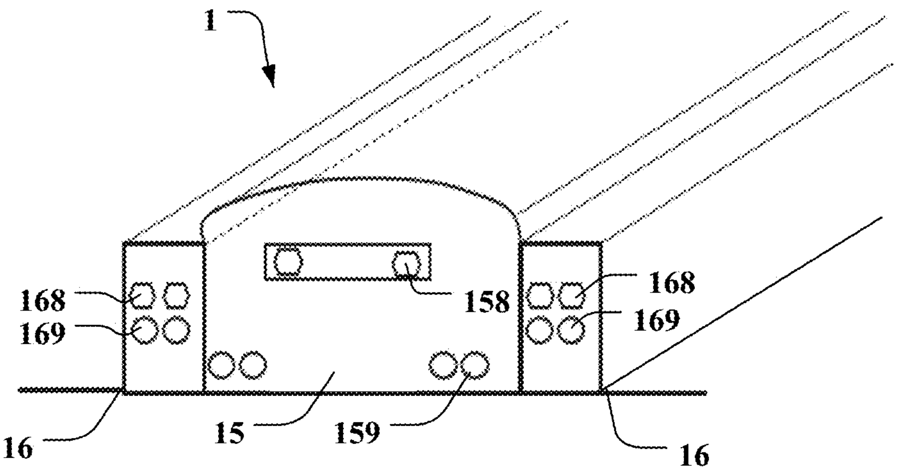
FIG. 13 is a diagram of an interface structure of an antenna system according to an embodiment of this application.
Figure 14:
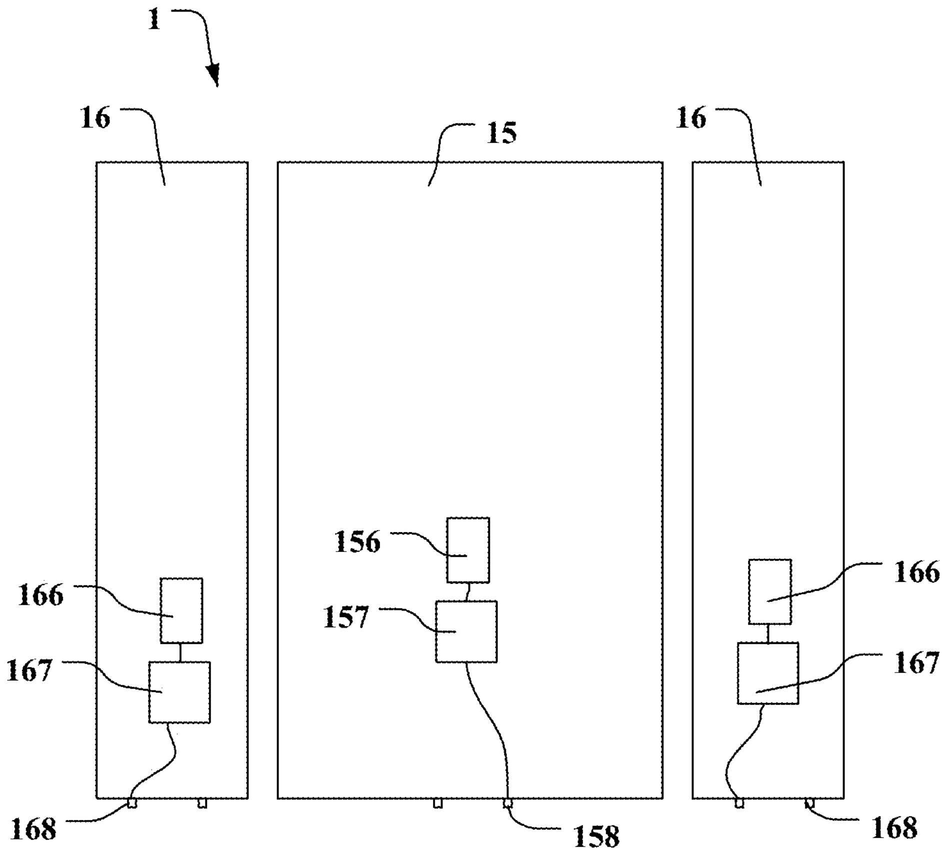
FIG. 14 is a diagram of an internal structure of an antenna system according to an embodiment of this application.

FIG. 13 is a diagram of an interface structure of an antenna system according to an embodiment of this application, and may be a diagram of an interface structure of an end face of the antenna system shown in FIG. 9. FIG. 14 is a diagram of an internal structure of an antenna system according to an embodiment of this application, and may be a diagram of an internal structure of the antenna system shown in FIG. 13. As shown in FIG. 13 and FIG. 14, in an embodiment, the first antenna 15 includes a first motor 156, a first mainboard 157, and a first driver interface 158. The first driver interface 158 is configured to receive a drive signal, and the first mainboard 157 is connected to the first driver interface 158 and is configured to receive the drive signal. In addition, the first mainboard 157 is connected to the first motor 156. The first mainboard 157 drives, based on the drive signal, the first motor 156 to operate, to adjust a phase and an amplitude of the first antenna 15. The second antenna 16 includes a second motor 166, a second mainboard 167, and a second driver interface 168. The second driver interface 168 is configured to receive a drive signal, and the second mainboard 167 is connected to the second driver interface 168 and is configured to receive the drive signal. In addition, the second mainboard 167 is connected to the second motor 166. The second mainboard 167 drives, based on the drive signal, the second motor 166 to operate, to adjust a phase and an amplitude of the second antenna 16.

In addition, the first antenna 15 further has a first radio frequency interface 159, and the first radio frequency interface 159 is connected to the first mainboard 157, and is configured to transmit a radio frequency signal to the first radiating element array 151. The second antenna 16 has a second radio frequency interface 169, and the second radio frequency interface 169 is connected to the second mainboard 167, and is configured to transmit a radio frequency signal to the first radiating element array 151. Configured to transmit a radio frequency signal.

In a specific embodiment, the first driver interface 158 may be an antenna interface standards group (AISG) interface. Similarly, the second driver interface 168 may also be an antenna interface standards group (AISG) interface. This is not limited in this application.

In a specific technical solution, the first motor 156 and the first mainboard 157 may be disposed on the first phase shifter 152, and the second motor 166 and the second mainboard 167 may be disposed on the second phase shifter 162.

Figure 15:
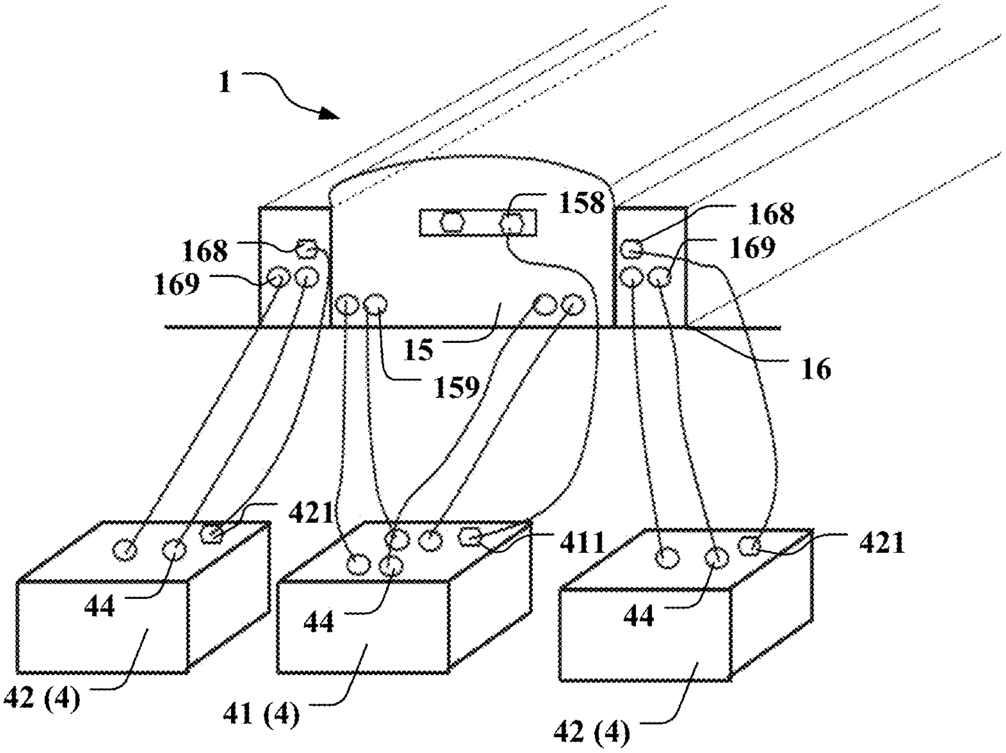
FIG. 15 is a diagram of a structure of a base station antenna feeder system according to an embodiment of this application.

FIG. 15 is a diagram of a structure of a base station antenna feeder system according to an embodiment of this application. As shown in FIG. 15, the base station antenna feeder system may further include a remote radio unit 4 (RRU). Specifically, in the embodiment shown in FIG. 15, the base station antenna feeder system includes three remote radio units 4. The remote radio unit 4 includes a third radio frequency interface 44. The third radio frequency interface 44 is connected to the first radio frequency interface 159 of the first antenna 15 and the second radio frequency interface 169 of the second antenna 16.

Figure 16:
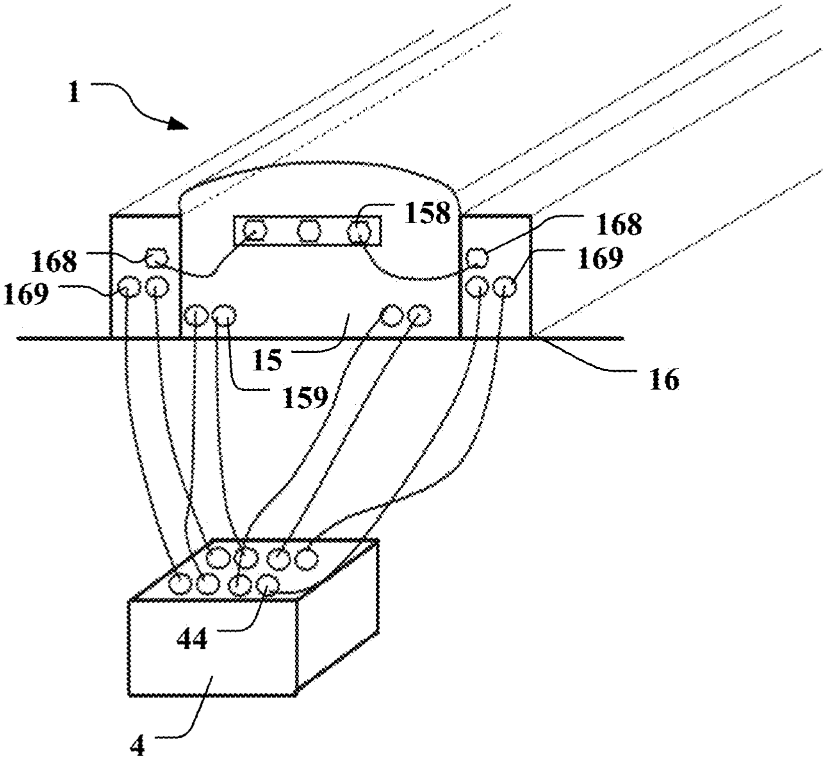
FIG. 16 is a diagram of another structure of a base station antenna feeder system according to an embodiment of this application.

The first antenna 15 and the second antenna 16 may be separately and independently driven, that is, the first antenna 15 and the second antennas 16 are respectively connected to the remote radio units 4, as shown in FIG. 15. Alternatively, FIG. 16 is a diagram of another structure of a base station antenna feeder system according to an embodiment of this application. In the embodiment shown in FIG. 16, the second antenna 16 may alternatively be driven by the first antenna 15. To be specific, the second mainboard 167 of the second antenna 16 and the first mainboard 157 of the first antenna 15 are connected, for example, are connected by connecting the first driver interface 158 to the second driver interface 168, so that the second antenna 16 can be driven by the first antenna 15.

When the first antenna 15 and the second antenna 16 are separately and independently driven, the remote radio units 4 include a first remote radio unit 41 and a second remote radio unit 42. The first remote radio unit 41 includes a third driver interface 411, and the second remote radio unit 42 includes a fourth driver interface 421. In actual operation, the third driver interface 411 is connected to the first driver interface 158 to input a drive signal to the first antenna 15, to drive, via the first remote radio unit 41, the first antenna 15 to operate. The fourth driver interface 421 is connected to the second driver interface 168 to input a drive signal to the second antenna 16, to drive, via the second remote radio unit 42, the second antenna 16 to operate. In this solution, the first antenna 15 and the second antenna 16 may be separately and independently driven. In a specific embodiment, as shown in FIG. 15, each antenna is correspondingly connected to one remote radio unit 4. The third driver interface 411 and the fourth driver interface 421 may be antenna interface standards group (AISG) interfaces.

As shown in FIG. 16, in another embodiment, the remote radio unit 4 includes a fifth driver interface 43. The fifth driver interface 43 is connected to the first driver interface 158 to input a drive signal to the first antenna 15. The first driver interface 158 is connected to the second driver interface 168, so that the drive signal can be transmitted to the second antenna 16 via the first antenna 15. In this solution, the second antenna 16 can be driven by the first antenna 15 to operate. Refer to FIG. 14. In this solution, the first mainboard 157 receives the drive signal, and transmits the drive signal to the second mainboard 167 through the first driver interface 158 and the second driver interface 168 to drive the second antenna 16. It should be noted that the remote radio unit 4 may include a plurality of fifth driver interfaces 43, and the plurality of fifth driver interfaces 43 may be located on different remote radio units 4, as shown in FIG. 16. Alternatively, in another embodiment, the plurality of fifth driver interfaces 43 may be located on a same remote radio unit 4. This is not limited in this application.

Figure 17:
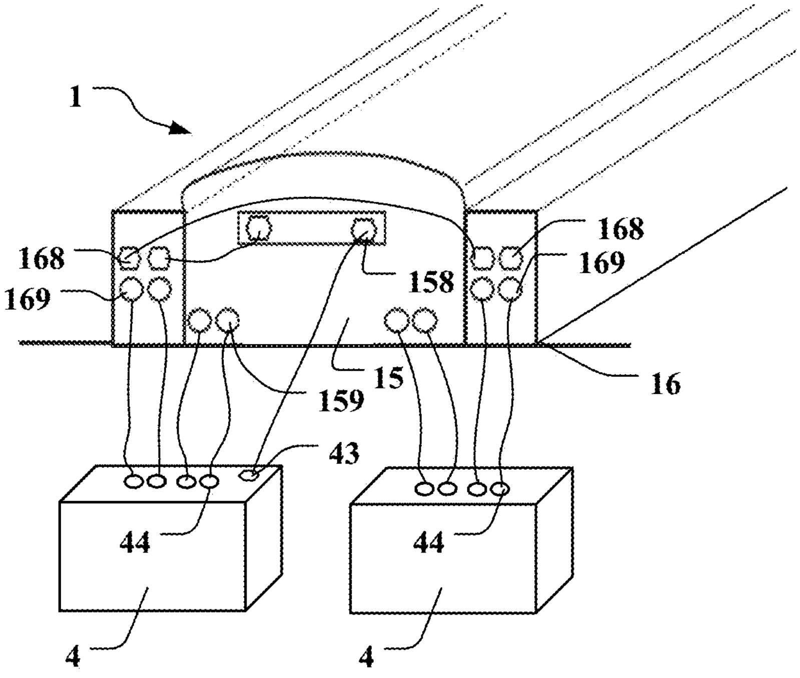
FIG. 17 is a diagram of another structure of a base station antenna feeder system according to an embodiment of this application.

When the antenna system 1 includes a plurality of second antennas 16, the second driver interface 168 of each second antenna 16 may be separately connected to the first driver interface 158 of the first antenna 15, as shown in FIG. 16. Alternatively, in another embodiment, the second driver interfaces 168 of different second antennas 16 may be connected, and then the second driver interface 168 of one of the second antennas 16 is connected to the first driver interface 158, as shown in FIG. 17. This is not limited in this application.

Figure 18:
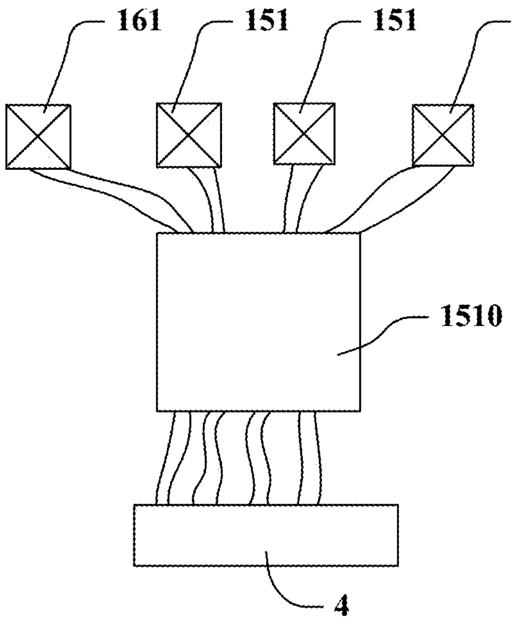
FIG. 18 is a diagram of a local structure of a base station antenna feeder system according to an embodiment of this application.

FIG. 18 is a diagram of a local structure of a base station antenna feeder system according to an embodiment of this application. As shown in FIG. 18, in this embodiment of this application, the first antenna 15 may further include a correction circuit board 1510. One end of the correction circuit board 1510 is connected to the first radiating element array 151 and the second radiating element array 161, and the other end of the correction circuit board 1510 is connected to the remote radio unit 4. Lengths of jumpers connected between the remote radio unit 4 and both of the first antenna 15 and the second antenna 16 are different. Therefore, the phase of the first radiating element array 151 may be different from the phase of the second radiating element array 161. The correction circuit board 1510 is configured to correct the phases of the first radiating element array 151 and the second radiating element array 161, to normalize phase information of the interfaces of the antenna system 1. In another embodiment, a calibration program may alternatively be set in the remote radio unit 4 to calibrate the phases of the first radiating element array 151 and the second radiating element array 161.

Apparently, a person skilled in the art can make various modifications and variations to this application without departing from the protection scope of this application. In this way, this application is also intended to include these modifications and variations, provided that these modifications and variations of this application fall within the scope of the claims of this application and equivalent technologies thereof.

What is claimed is:

1. An antenna system, comprising a first antenna and a second antenna, wherein the first antenna comprises a first radiating element array and a first phase shifter, the first radiating element array is electrically connected to the first phase shifter;

the second antenna comprises a second radiating element array and a second phase shifter, and the second radiating element array is electrically connected to the second phase shifter; and the first phase shifter is disposed at an edge of the first antenna, and the first phase shifter of the first antenna is used as a connector for detachably connecting to the second antenna.

2. The antenna system of claim 1, wherein the first phase shifter is used as the connector for detachably connecting to the second phase shifter of the second antenna.

3. The antenna system of claim 2, wherein the first antenna comprises a first reflection plate, and the first reflection plate is a full-frequency reflection plate or a frequency selective surface, the first phase shifter is disposed at an edge of the reflection plate.

4. The antenna system of claim 1, wherein the first phase shifter and the second phase shifter are disposed in an integrated structure such that the first antenna and the second antenna are connected by the integrated structure.

5. The antenna system of claim 1, wherein the first radiating element array comprises a first radiating element and a first balun, the first radiating element is electrically connected to the first phase shifter via the first balun, the second radiating element array comprises a second radiating element and a second balun, the second radiating element is electrically connected to the second phase shifter via the second balun, the first balun tilts toward a direction in which the first phase shifter faces away from the second phase shifter, and the second balun tilts toward a direction in which the second phase shifter faces away from the first phase shifter.

6. The antenna system of claim 1, wherein the second radiating element array comprises a second radiating element and a second balun, the second radiating element is electrically connected to the second phase shifter via the second balun, and the second balun is perpendicular to a surface of the second radiating element.

7. The antenna system of claim 1, wherein the first antenna comprises a first reflection plate, and the first reflection plate is a full-frequency reflection plate or a frequency selective surface.

8. The antenna system of claim 1, wherein the second antenna comprises a second reflection plate, a cross section of the second phase shifter is rectangular, and a length that is of the cross section of the second phase shifter and that is in a direction perpendicular to the second reflection plate is greater than a length that is of the cross section of the second phase shifter and that is in a direction parallel to the second reflection plate.

9. The antenna system of claim 1, wherein a radiating surface of the first radiating element array is parallel to a radiating surface of the second radiating element array.

10. The antenna system of claim 1, wherein the antenna system further comprises a correction circuit board, and the correction circuit board is electrically connected to the first radiating element array and the second radiating element array, and is configured to correct phases of the first radiating element array and the second radiating element array.

11. The antenna system of claim 1, wherein an operating frequency band of the first antenna is the same as an operating frequency band of the second antenna.

12. A base station antenna feeder system, comprising an antenna system having a first antenna and a second antenna, wherein the first antenna comprises a first radiating element array and a first phase shifter, the first radiating element array is electrically connected to the first phase shifter;

the second antenna comprises a second radiating element array and a second phase shifter, and the second radiating element array is electrically connected to the second phase shifter; and the first phase shifter is disposed at an edge of the first antenna, and the first phase shifter of the first antenna is used as a connector for detachably connecting to the second antenna.

13. The base station antenna feeder system of claim 12, wherein the first phase shifter is used as the connector for detachably connecting to the second phase shifter of the second antenna.

14. The base station antenna feeder system of claim 12, wherein the first phase shifter and the second phase shifter are disposed in an integrated structure such that the first antenna and the second antenna are connected by the integrated structure.

15. The base station antenna feeder system of claim 12, wherein the first radiating element array comprises a first radiating element and a first balun, the first radiating element is electrically connected to the first phase shifter via the first balun, the second radiating element array comprises a second radiating element and a second balun, the second radiating element is electrically connected to the second phase shifter via the second balun, the first balun tilts toward a direction in which the first phase shifter faces away from the second phase shifter, and the second balun tilts toward a direction in which the second phase shifter faces away from the first phase shifter.

16. The base station antenna feeder system of claim 12, further comprising an installation bracket, wherein the antenna system comprises an installation structure, the installation structure is installed on the installation bracket, and the installation structure is connected to only the first antenna.

17. The base station antenna feeder system of claim 12, wherein the first antenna comprises a first mainboard and a first driver interface, and the first driver interface is connected to the first mainboard; the second antenna comprises a second mainboard and a second driver interface, and the second driver interface is connected to the second mainboard; the base station antenna feeder system further comprises remote radio units, the remote radio units comprise a first remote radio unit and a second remote radio unit, the first remote radio unit comprises a third driver interface, and the second remote radio unit comprises a fourth driver interface; and the third driver interface is connected to the first driver interface, and the fourth driver interface is connected to the second driver interface.

18. The base station antenna feeder system of claim 12, wherein the first antenna comprises a first mainboard and a first driver interface, the first driver interface is connected to the first mainboard, the second antenna comprises a second mainboard and a second driver interface, the second driver interface is connected to the second mainboard, the base station antenna feeder system further comprises a remote radio unit, the remote radio unit comprises a fifth driver interface, the first driver interface is connected to the second driver interface, and the fifth driver interface is connected to the first driver interface.

* * * * *